United States Patent
Devi et al.

(10) Patent No.: US 7,551,616 B2
(45) Date of Patent: Jun. 23, 2009

(54) FORWARDING PACKETS TO AGGREGATED LINKS USING DISTRIBUTED INGRESS CARD PROCESSING

(75) Inventors: Bharathi B. Devi, Plano, TX (US); Kyl W. Scott, Richardson, TX (US); Edward A. Harbin, Dallas, TX (US); Nikhil Kanodia, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 749 days.

(21) Appl. No.: 11/158,699

(22) Filed: Jun. 22, 2005

(65) Prior Publication Data

US 2005/0238018 A1    Oct. 27, 2005

Related U.S. Application Data

(63) Continuation of application No. 10/131,886, filed on Apr. 24, 2002, now Pat. No. 6,973,082, which is a continuation of application No. 10/061,111, filed on Feb. 1, 2002, now abandoned.

(51) Int. Cl.
*H04B 3/20* (2006.01)

(52) U.S. Cl. .................................. 370/389

(58) Field of Classification Search ................ 370/389, 370/390, 392
See application file for complete search history.

(56) References Cited

U.S. PATENT DOCUMENTS

| | | | |
|---|---|---|---|
| 5,732,080 A | 3/1998 | Ferguson et al. | 370/392 |
| 5,864,535 A | 1/1999 | Basilico | 370/231 |
| 6,049,528 A | 4/2000 | Hendel et al. | 370/235 |
| 6,069,889 A | 5/2000 | Feldman et al. | 370/351 |
| 6,115,378 A | 9/2000 | Hendel et al. | 370/392 |
| 6,151,324 A | 11/2000 | Belser et al. | 370/397 |
| 6,243,360 B1 | 6/2001 | Basilico | 370/231 |
| 6,314,525 B1 | 11/2001 | Mahalingham et al. | 714/4 |
| 6,501,749 B1 | 12/2002 | Alexander et al. | 370/351 |
| 6,636,510 B1 | 10/2003 | Lee et al. | 370/390 |
| 6,654,343 B1 | 11/2003 | Brandis et al. | 370/229 |
| 6,665,495 B1 | 12/2003 | Miles et al. | 398/54 |
| 6,721,271 B1 | 4/2004 | Beshai et al. | 370/232 |
| 6,747,971 B1 | 6/2004 | Hughes et al. | 370/387 |
| 2003/0147385 A1 | 8/2003 | Montalvo et al. | 370/389 |
| 2007/0147238 A1 * | 6/2007 | Kadambi et al. | 370/229 |
| 2008/0025295 A1 * | 1/2008 | Elliott et al. | 370/356 |

FOREIGN PATENT DOCUMENTS

| | | |
|---|---|---|
| EP | 0 910 195 A2 | 4/1999 |
| EP | 1 011 227 A2 | 6/2000 |
| EP | 1 168 725 A2 | 1/2002 |
| WO | WO 00/72523 A1 | 11/2000 |
| WO | WO 01/65777 A1 | 9/2001 |

OTHER PUBLICATIONS

Translation of an Office Action of Japanese Patent Office, Japanese Patent Application No. 2003-567049, 2 pages.

* cited by examiner

*Primary Examiner*—Derrick W Ferris
*Assistant Examiner*—Christopher R Crompton
(74) *Attorney, Agent, or Firm*—Baker Botts L.L.P.

(57) ABSTRACT

A method performed by an ingress card includes receiving a packet with a destination identifier, and determining an aggregated link associated with the destination identifier that includes multiple egress ports. The method further includes determining a destination port from the egress ports of the aggregated link, and communicating the packet to the destination port.

10 Claims, 4 Drawing Sheets

FORWARDING PACKETS TO AGGREGATED LINKS USING DISTRIBUTED INGRESS CARD PROCESSING

RELATED APPLICATIONS

This application is a continuation of U.S. patent application Ser. No. 10/131,886 filed Apr. 24, 2002 now U.S. Pat. No. 6,973,082 and entitled "Forwarding Packets to Aggregated Links Using Distributed Ingress Card Processing," which is a continuation of U.S. patent application Ser. No. 10/061,111 filed Feb. 1, 2002 now abandoned and entitled "Forwarding Packets to Aggregated Links Using Distributed Ingress Card Processing," which is hereby incorporated by reference.

TECHNICAL FIELD OF THE INVENTION

This invention relates in general to packet based communication networks, and more particularly to a method and system for forwarding packets to aggregated links using distributed ingress card processing.

BACKGROUND OF THE INVENTION

As telecommunication networks handle more and more traffic, new methods are constantly being developed that allow the networks to process larger flows of information. Link aggregation is one example. In link aggregation, several physical links are aggregated to appear as one logical link to a telecommunications system. This aggregation allows all of the links to be used actively, rather than having particular links reserved. Thus, link aggregation provides more efficient use of network resources and better load balancing. The tradeoff, however, is that link aggregation may also require substantial additional processing and/or hardware to implement the aggregated links.

SUMMARY OF THE INVENTION

In accordance with the present invention, the disadvantages and problems associated with implementing link aggregation in switches have been substantially reduced or eliminated. In particular, certain embodiments of the present invention provide a method and system for implementing link aggregation using distributed processing. Certain embodiments of the present invention are also compliant with the IEEE standards for link aggregation, set out in IEEE Standard 802.3.

In accordance with one embodiment of the present invention, a method performed by an ingress card includes receiving a packet comprising a destination identifier. The method also includes determining an aggregated link associated with the destination identifier, and determining a destination port from the egress ports of the aggregated link. The method further includes communicating the packet to the destination port.

In accordance with another embodiment of the present invention, a method performed by an ingress card includes receiving a packet and determining egress links for the packet. The method also includes determining whether each link is an aggregated link with multiple egress ports or a non-aggregated link with a single egress port. For each aggregated link, a destination port is determined from the egress ports, and the packet is communicated to the destination port. For each non-aggregated link, a copy of the packet is communicated to the single egress port.

Important technical advantages of certain embodiments of the present invention include implementing link aggregation using distributed processing among ingress components. For example, individual ingress cards can determine a destination port for a packet, eliminating the need for a separate processing stage implemented in hardware and/or software to separately determine the destination port from a packet after the ingress card forwards the packet to a link. This improves the efficiency and speed of packet forwarding in a switch.

Yet another important technical advantage of certain embodiments is a distributed architecture that may be used to process a variety of packet traffic. For example, certain embodiments of an ingress card can forward unicast, multicast, and bridging traffic. Particular embodiments may process packets from different protocols as well.

Other important technical advantages of certain embodiments of the present invention include load balancing. The tables or other information used by the ingress card to determine a destination port for packets may also include additional usage information that allows the ingress card to determine a destination port from the egress ports in an aggregated link. This means that rather than using one link to the exclusion of others, loads may be distributed among several links in an aggregated link in a more balanced fashion. Particular embodiments of the present invention may have some, all or none of the enumerated technical advantages. Still other important technical advantages will be apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
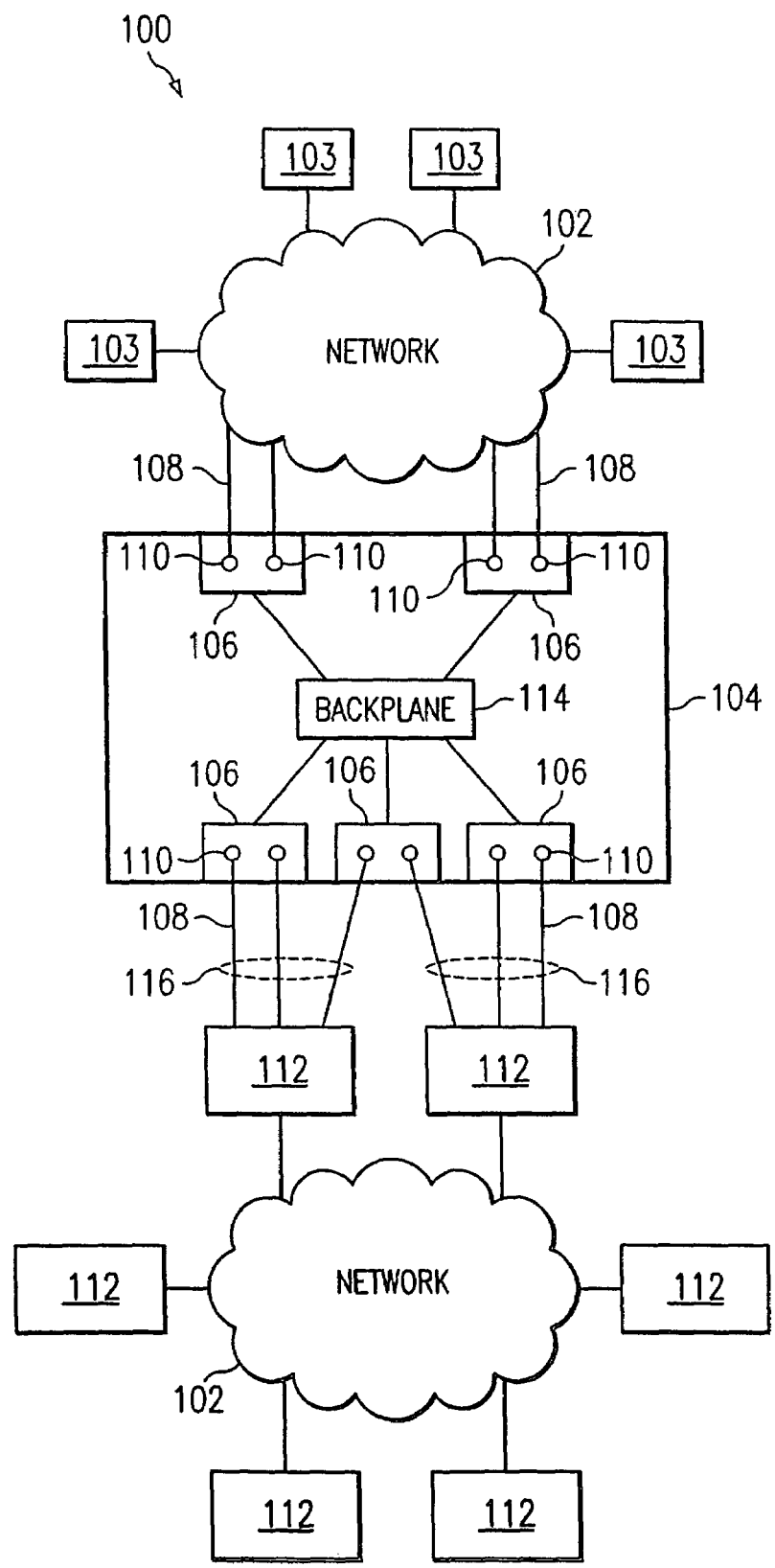
FIG. 1 shows a network including a switch according to one embodiment of the present invention.

FIG. 1 shows a system 100 that includes a switch 104 coupled to a network 102. Using network 102 and switch 104, packets are communicated from sources 103 to destinations 112. Components of switch 104 are referred to as "ingress" components when receiving packets from sources 103 and "egress" components when sending packets to destinations 112.

Network 102 represents any suitable structure for communicating packets, cells, frames, segments, or other portions of data (generally referred to as "packets"). Network 102 may represent the Internet, extranet, local area network (LAN), synchronous optical network (SONET), wide area network (WAN), the public switched telephone network (PSTN), or any other suitable network for communicating information. Network 102 may include routers, switches, hubs, endpoints, or any other network device that communicates information. Network 102 contemplates any number or arrangement of components that exchange information.

Sources 103 represent any source of information in packet form. Sources 103 need not be the original device that generated the packet, but need only convey a packet to network 102. Sources 103 may be any hardware and/or software configured to communicate information, including endpoints, switches, routers, hubs, or any other suitable network device.

Switch 104 sends and receives packets. Switch 104 may represent any suitable device, including an Ethernet switch, router, hub, or any other suitable hardware and/or software configured to receive packets and communicate them to other devices. Switch 104 includes cards 106 coupled to physical links 108 and a backplane 114 that represents hardware and/or software allowing cards 106 in switch 104 to exchange information with one another.

Cards 106 represent separate components of hardware and/or software in switch 104 that exchange packets with network 102. Cards 106 may include traditional interface cards, as well as any other component, module, or part of switch 104 capable of independently receiving packets and communicating those packets to other components of switch 104. Each card 106 has one or more ports 110 coupled to physical links 108. Cards 106 may exchange information and packets with one another using backplane 114. Each card 106 includes sufficient processing capability to identify a port 110 in another card 106 in switch 104 and to communicate a packet to that port 110.

Physical links 108 represent physical interfaces between switch 104 and other devices. Links 108 may include fiber optic connections, cables, wireless links, or any other suitable method for communicating information between switch 104 and other devices. Links 108 couple to cards 106 of switch 104 using ports 110. Port 110 represents any suitable physical interface between card 106 and physical link 108 allowing information to be received from link 108 and communicated to link 108. Each physical link 108 is associated with one physical connection in the form of port 110.

A card 106, port 110 or link 108 used to receive a packet from a source 103 is referred to as an "ingress" card 106, port 110, or link 108. A card 106, port 110 or link 108 used to communicate a packet to a destination 112 is referred to as an "egress" card 106, port 110, or link 108. Cards 106, ports 110, and links 108 may be bidirectional, so that a particular component may be either an ingress or egress component depending on whether the component sends or receives a packet at a given time.

Destinations 112 represent any hardware and/or software configured to receive packets. Destinations 112 may include routers, switches, endpoints or any other suitable network device. Destinations 112 may be intermediate destinations for the packet before the packet reaches its final destination. For example, a packet may contain information identifying a final destination, but switch 104 may determine that for the packet to reach its final destination, it must first be communicated to one of the destinations 112 coupled to switch 104. Destinations 112 may also be sources 103 of packets, and sources 103 of packets may be destinations 112 of other packets as well.

Multiple physical links 108 to a particular destination 112 may be aggregated to form an aggregated link 116. Aggregated link 116 represents multiple physical links 108 that are addressed by a single logical address, such as a medium access controller (MAC) address, an Internet protocol (IP) address, or other suitable address or identifier, or otherwise treated as a single logical link between switch 104 and a destination 112. Because aggregated link 116 includes multiple physical links 108 that go to the same destination 112, a packet sent to destination 112 need only be sent to one port 110 corresponding to one physical link 108 of aggregated link 116. One technical advantage of certain embodiments of the present invention is that ingress cards 106 may communicate packets to ports 110 in some alternating fashion, such as round robin, random selection, pseudo-random selection using hash tables, or any other selection technique. This allows the load on any particular physical link 108 to be balanced with the loads on other physical links 108 in aggregated link 116.

Figure 2:
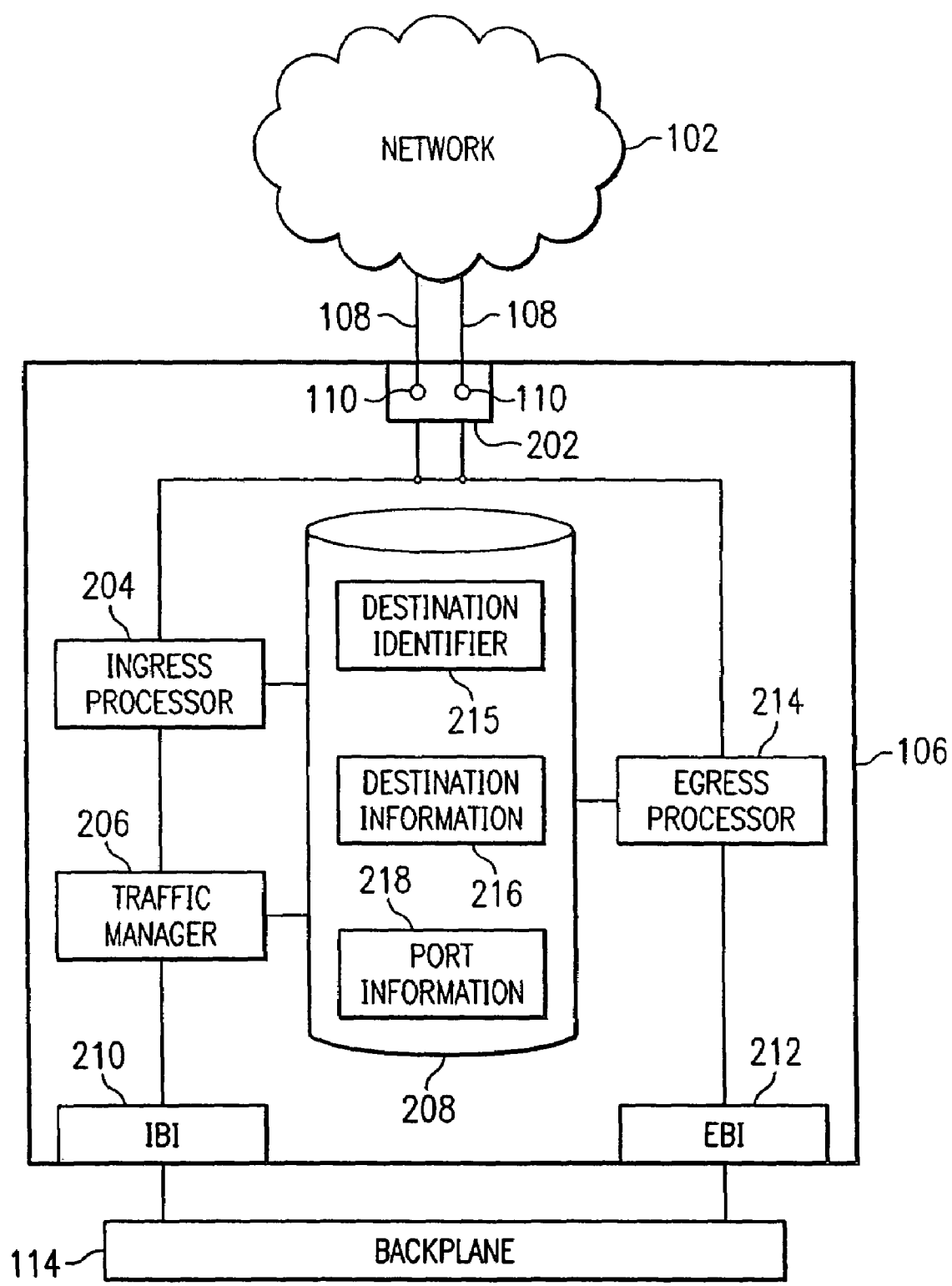
FIG. 2 shows a card within the switch of FIG. 1.

FIG. 2 shows a card 106 in more detail. Card 106 couples to backplane 114 of switch 104 using ingress backplane interface (IBI) 210 and egress backplane interface (EBI) 212. Card 106 couples to network 102 through physical layer devices 202, including ports 110 coupled to links 108. Card 106 includes an ingress processor 204, an egress processor 214, a traffic manager 206, and a memory 208. Card 106 may exchange packets from network 102 or backplane 114. Packets received from network 102 are considered to be on the "ingress" side, while packets received from the backplane 114 are considered to be on the "egress side" of card 106. Thus, at the level of card 106, the terms "ingress" and "egress" refer to the function of those components with respect to receiving packets from network 102 or backplane 114.

Physical layer devices 202 represent any physical interface between card 106 and network 102. In particular, physical layer devices 202 may represent any combination of ports 110 and links 108 as described in conjunction with FIG. 1. For example, each card 106 may include two ports 110 each coupled to a physical link 108, but any number of ports 110 or links 108 may be used.

Ingress processor 204 and traffic manager 206 represent any combination of hardware and/or software that allows card 106 to route packets received from physical layer device 202. In a particular embodiment, ingress processor 204 handles routing for unicast packets, while traffic manager 206 handles routing for multicast packets. "Unicast" refers to any packet directed to a single destination, while "multicast" refers to packets that have multiple destinations.

IBI 210 and EBI 212 refer to any port or connection, real or virtual, between card 106 and backplane 114 of switch 104. IBI 210 and EBI 212 may represent separate components, or alternatively, may represent the same hardware and/or software used to send and receive packets from backplane 114. Functionally, IBI 210 sends packets to backplane 114, while EBI 212 receives packets from backplane 114.

Egress processor 214 handles routing of outgoing packets to network 102. Egress processor 214 represents any suitable combination of hardware and/or software for processing packets. Egress processor 214 may also receive acknowledgements from other devices that have received packets. This allows egress processor 214 to "learn" destinations for various packets by receiving acknowledgements of receipt from downstream devices and to store the learned destinations in memory 208.

Memory 208 represents any media for the storage of information, including magnetic media, optical media, random access memory (RAM), read only memory (ROM), removable media, or any other suitable form of information storage. Memory 208 stores a variety of information concerning routing of packets. This information is accessible by components of card 106, such as ingress processor 204, traffic manager 206, and egress processor 214. In a particular embodiment, memory 208 stores a destination identifier 215, destination information 218 and a port information 218.

Destination identifier 215 represents information identifying an intermediate or final destination 112 for the packet. Destination identifier 215 may include a network address for destination 112, a logical address for an egress link, or any other information useful for identifying the destination of a packet. Destination identifier 215 contemplates any information determinable from a packet that allows card 106 to identify one or more destinations 112 for the packet.

Destination information 216 associates destination identifiers 215 in packets with egress links. Destination information 216 may be organized in any suitable fashion, including one or more tables, files, databases, or other form of organization. Card 106 uses destination information 216 to determine an egress link or links using destination identifier 215 from a packet. For example, a multicast packet may include a multicast group identifier instead of individual link addresses. Ingress card 106 receives the packet, looks up the multicast group identifier, and determines the egress links associated with the multicast group. In another example, the packet may include a final destination address (such as an IP address for a receiving device) rather than a link address from switch 104. In that case, ingress link 106 uses destination information 216 to determine an egress link to the final destination. Destination information 216 may include one or more layers as well. For example, destination information 216 may include a first table relating a multicast group to destination IP addresses, and a second table relating the destination IP addresses to logical link addresses. Card 106 may also update destination information 216 as new or additional information becomes available, such as when card 106 receives an acknowledgement from a destination 112 indicating that a packet was received.

Port information 218 refers to any form of data that identifies ports 110 associated with a particular link. For example, port information 218 for a non-aggregated link 108 identifies the single egress port 110 for the non-aggregated link 108. Port information 218 for an aggregated link 116 identifies the multiple ports 110 coupled to the physical links 108 of aggregated link 116, which may include ports 110 on a single card 106 or multiple cards 106. Port information 218 may also identify which card 106 is coupled to each port 110. Port information 218 contemplates any suitable arrangement of data, such as a table, database or any other format. Card 106 may update port information 218 as network conditions change, e.g., when a port 110 or physical link 108 fails.

In operation, card 106 receives a packet from network 102. Ingress card 106 determines the destination for the particular packet and consults destination information 216 to see if that destination is associated with a particular egress link. Some packets may have a destination identifier 215 that card 106 has not yet learned, and so destination information 216 does not include an egress link or links associated with destination identifier 215 of the packet. In such cases, card 106 may flood all available egress links so that the packet will arrive at its proper destination, and that destination will send an acknowledgment back to card 106. To flood destinations, card 106 determines logical links coupled to switch 104 using port information 218. Card 106 communicates the packet to these links, excluding the link from which the packet was received. In a particular embodiment, flooded cards will replicate the packet to all ports within that card, so card 106 need only communicate the packet once to a particular egress card 106.

If a destination has been previously learned, card 106 determines the appropriate egress link (unicast) or links (multicast) using destination information 216. For each aggregated link, card 106 then uses port information 218 to determine a destination egress port 110 of the aggregrated egress link 116. Card 106 then forwards the packet to the destination egress port 110. For non-aggregated links, card 106 communicates the packet to the single egress port 110 of the non-aggregated link 108.

Although particular embodiments and modes of operation of switch 104 and card 106 have been described in detail, numerous variations will be apparent to one skilled in the art. The particular functions described may be performed by a wide variety of hardware and/or software, and may be distributed among the components of switch 104 described and any suitable additional components. Furthermore, particular components may be replaced or omitted and other components added without changing the overall operation described.

Figure 3:
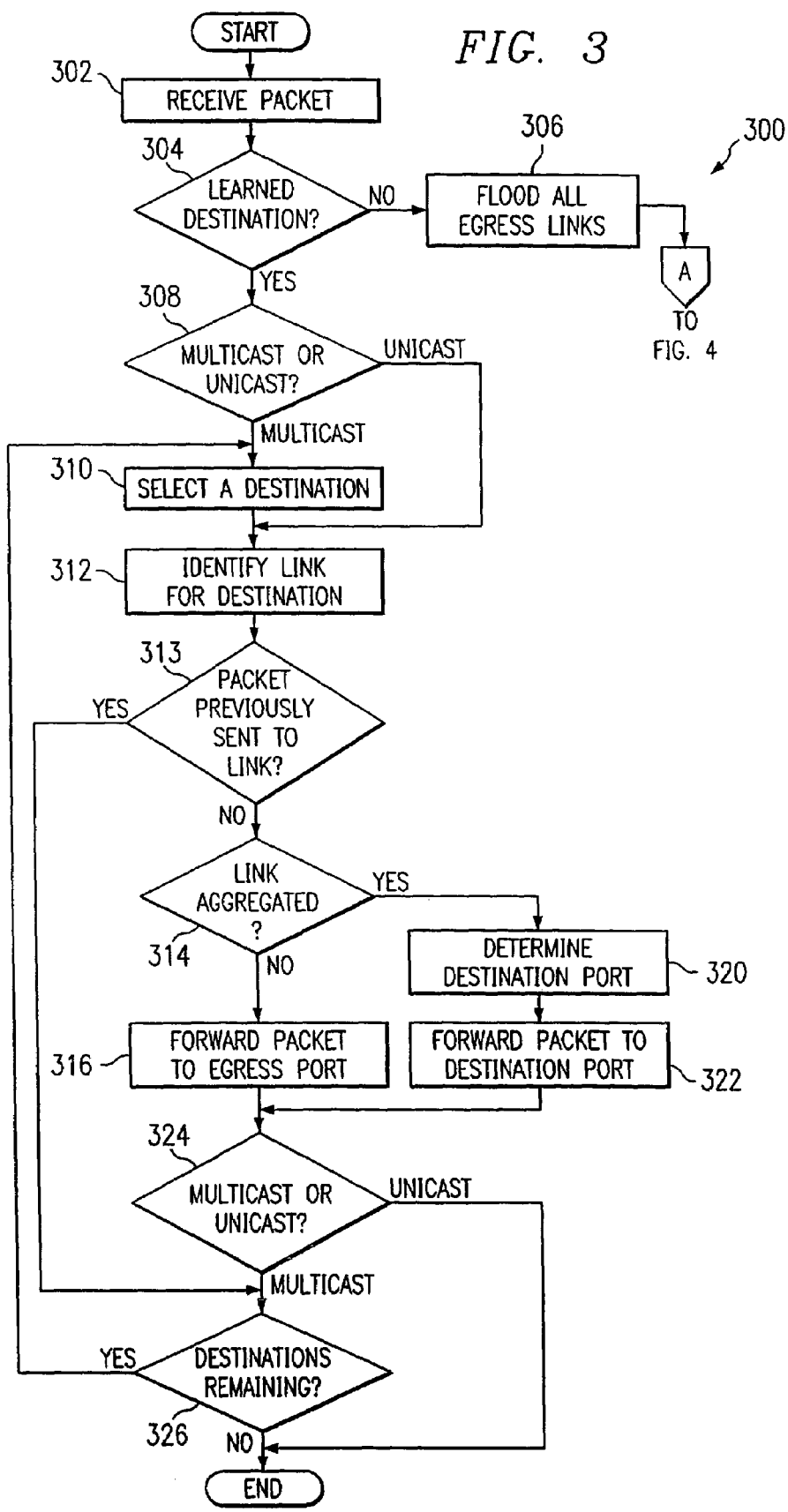
FIG. 3 is a flowchart showing a method for forwarding unicast or multicast packets.

FIG. 3 is a flow chart 300 showing a method for forwarding packets in both unicast and multicast methods of operation. In the unicast case, card 106 must communicate the packet to a single destination 112. In the multicast case, card 106 must communicate the packet to multiple destinations 112, which may be accessible by one or more egress links. The following method allows card 106 to communicate the packet to all of its destinations 112 without sending multiple copies of the packet to the same destination.

Card 106 receives a packet at step 302. At step 304, card determines destination identifier 215 for the packet and uses destination information 216 to determine if card 106 has previously learned the destination identifier 215. If the destination has not been previously learned, card 106 floods all egress links at step 306, shown in more detail in FIG. 4 described below.

If destination identifier 215 of the packet has been learned, card 106 next determines if destination identifier 215 identifies a multicast or a unicast destination at step 308. If the packet is a multicast packet, card 106 selects one of the destinations for the packet using destination information 216 at step 310. On the other hand, if the packet is a unicast packet, there is only one destination, so there is no need to perform a selection process.

Card 106 identifies an egress link associated with the destination using destination information 216 at step 312. Card 106 determines whether the packet was previously sent to the selected link at step 313. For example, a multicast packet may have two destination accessible by the same egress link, so that communicating the packet to one of the destinations effectively communicates the packet to both destinations. In such cases, card 106 need not communicate the packet twice, and may move on to another destination, if any, of the multicast packet at step 326.

If card 106 has not previously communicated the packet to the egress link, card 106 determines whether the link is aggregated or not at step 314. If the link is a non-aggregated link 108, then card 106 determines the egress port 110 of the non-aggregated link 108 using port information 218 and forwards the packet to the single egress port 110 of the non-aggregated link 108 at step 316.

If the link is an aggregated link 116, card 106 determines a destination port 110 of aggregated link 116 using the information in port information 218 at step 320. Card 106 may select a particular destination port 110 from the multiple ports 110 of the aggregated link using random selection, load balancing, pseudo-random selection or hashing using part of the packet information, historical tracking, round robin, or any other method of selection. Card 106 then communicates the packet to the destination port 110 at step 322.

If the packet is a unicast packet that has been sent to its destination port, then the method is complete once the packet is communicated to the appropriate egress link. If, on the other hand, the packet is a multicast packet at step 324, then card 106 determines whether the packet has been sent to all of its destinations at step 326. If the packet has been sent to all destinations, then the method is complete. Otherwise, card 106 selects a new destination from the remaining destinations in the multicast group at step 310, and continues at step 312.

Although a particular embodiment of the method has been described, numerous variations will be apparent to one skilled in the art. For example, multicast packets may be sent to all destinations at one time rather than selecting individual destinations and sending a packet. Particular steps may be performed concurrently or continuously, and the particular order of steps may be varied as well. Furthermore, particular steps of the method may be omitted and added without changing the overall operation of the method.

Figure 4:
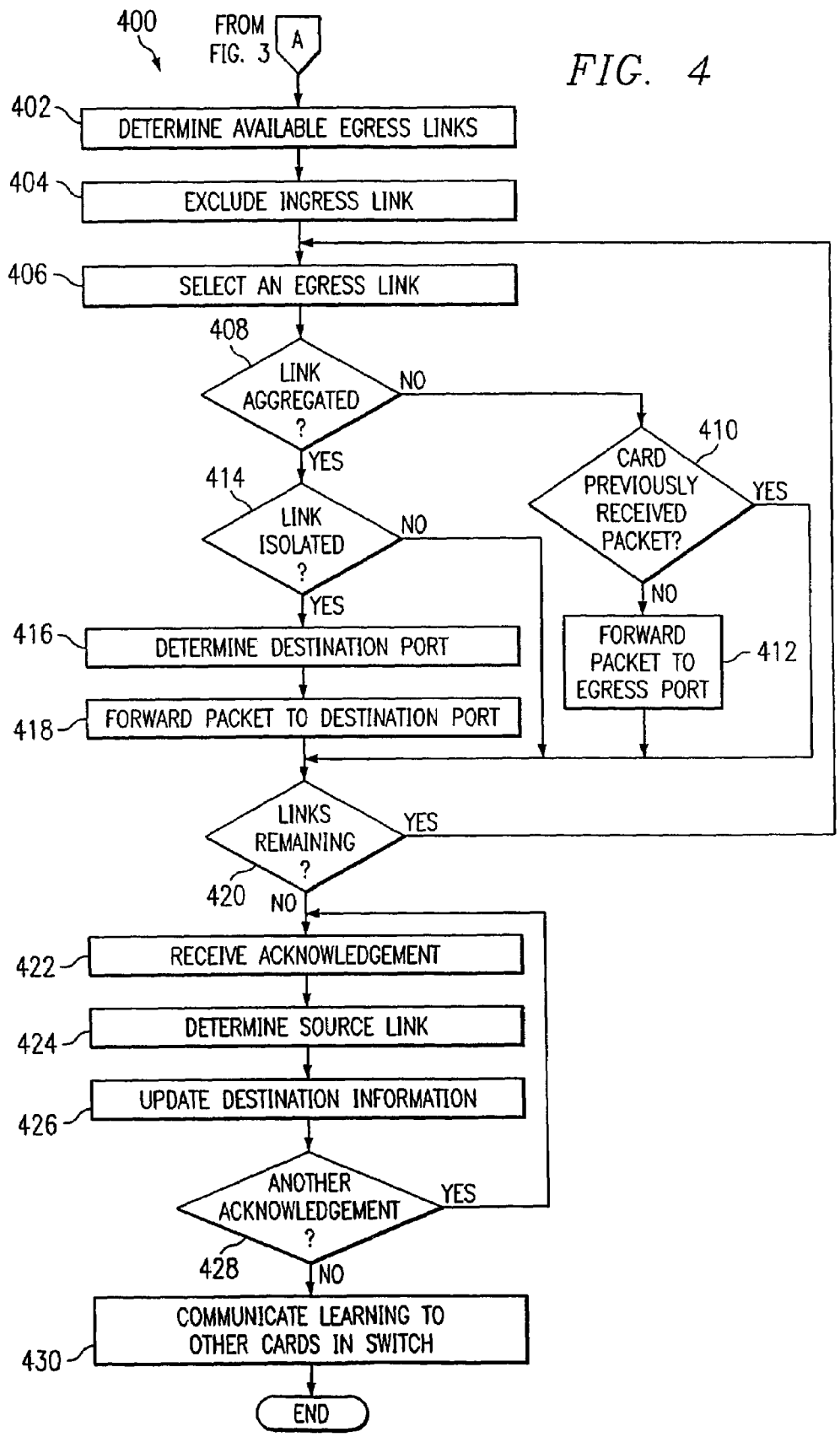
FIG. 4 is a flowchart showing a method for flooding egress links.

FIG. 4 is a flowchart 400 that shows a method for flooding destination addresses associated with switch 104. "Flooding" refers to sending a copy of the packet to all available links of switch 104. Card 106 floods a packet when card 106 fails to determine a particular link or links from destination identifier 215 of a packet. Because the correct link is not known, card 106 communicates a copy of the packet to all available links of switch 104. In a particular embodiment, when egress card 106 receives a packet, egress card 106 communicates a copy of the packet to all of its ports 106. Card 106, therefore, communicates only one copy of the packet to each egress card 106. With aggregated links 116, however, an aggregated link 116 may be spread out over multiple egress cards 106, but it is only necessary to communicate the packet to one egress card 106 of aggregated link 116 to reach destination 112 of aggregated link 116. To avoid needless duplication of the packet and the possible consequences that may result from such duplication, such as disrupting the order of packet delivery, card 106 may use the following method to exclude certain egress cards 106 from receiving a copy of the packet.

Card 106 determines all available egress links of switch 104 using port information 218 at step 402. Card 106 then excludes the ingress link from which the packet was received at step 404. The remaining egress links may then be used to communicate copies of the packet to all destinations accessible by card 106.

Card 106 selects one of the egress links at step 406. Card 106 then determines if the link is an aggregated link 116 with multiple egress ports 110 using port information 218 at step 408. If the link is not aggregated, card 106 determines whether the egress. card 106 coupled to the egress port 110 of the link has received a copy of the packet at step 410. Card 106 may determine whether a packet has been previously sent to a card 106 by keeping a record of packets sent in memory 208. For example, card 106 may indicate in port information 218 that a particular egress card 106 has received the packet. If the egress card 106. has previously received the packet at step 410, then card 106 does not need to send a copy of the packet to that egress card 106, since egress card 106 already replicates the packet to all available ports 110 of egress card 106. On the other hand, if the egress card 106 has not received the packet, card 106 forwards a copy of the packet to the egress card 106 that includes the egress port 110 of the link at step 412.

If the selected link is aggregated, card 106 then determines whether the aggregated link 116 is isolated using port information 218 at step 414. "Isolated" means that aggregated link 116 does not have any ports 110 that share an egress card 106 with non-aggregated link 108. Since card 106 must communicate a copy of the packet to each non-aggregated link 108 to reach the respective destinations 112 of the non-aggregated links 108, any card 106 that includes a port 110 of a non-aggregated link 108 must receive a copy of the packet. Because card 106 replicates packets, any aggregated link 116 that shares a card 106 with a non-aggregated link 108 receives a copy of the packet as well. Therefore, only aggregated links 108 that do not share a card 106 with a non-aggregated link 108 need to receive a copy of the packet.

If the egress link is an aggregated isolated link, card 106 communicates the packet to destination port 110 of aggregated link 116. Card 106 determines destination port 110 for the packet at step 416. Card 106 may use any suitable method to determine destination port 110, including any of the methods described in conjunction with FIGS. 2 and 3. Card 106 then communicates the packet to destination port 110 at step 418.

Card 106 then determines if there are any remaining egress links at step 420. If there are egress links remaining, then card 106 selects a new link to process at step 406. If there are no remaining links, then card 106 waits for an acknowledgement from one of the destinations that the packet was received. Card 106 receives the acknowledgement at step 422, and determines the link from which the acknowledgement was received at step 424. Card 106 then updates destination information 216 by associating the source link with destination identifier 215 at step 426. When the packet is a multicast packet, card 106 waits for acknowledgements from any remaining destinations at step 428. Card 106 may also communicate its learning to other cards 106 in switch 104 at step 430.

The method described is only one particular embodiment of numerous possible embodiments which may be apparent to one skilled in the art. For example, card 106 may initially determine which cards 106 need to receive the packet and communicate the packet to all of the cards 106 at once, rather than determining and communicating on a card-by-card basis. Card 106 may perform additional steps as well, such as receiving updated destination information 216 from other cards 106 in switch 104. Furthermore, particular steps may be performed in a different order, and certain steps may be modified or omitted without changing the overall operation of the described method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method performed by an ingress card of a switch, comprising:

receiving a packet comprising a destination identifier;

determining if the destination identifier has been previously learned;

if the destination identifier has been previously learned:
   determining an aggregated link associated with the destination identifier, the aggregated link comprising a plurality of egress ports, each egress port associated with an egress card of the switch, the switch comprising a plurality of egress cards;

determining a destination port from the egress ports of the aggregated link; and communicating the packet to the destination port; and if the destination identifier has not been previously learned, flooding the packet to all egress cards of the switch, wherein such flooding comprises:

determining an aggregated link associated with the destination identifier, the aggregated link comprising a plurality of egress ports;

determining whether the aggregated link is isolated such that the aggregated link does not have any egress ports associated with the same egress card as an egress port of a non-aggregated link; and communicating the packet to each egress card having an egress port included in the aggregated link except for the egress cards having an egress port associated with a non-aggregated link.

2. The method of claim 1, wherein:
the ingress card is coupled to the egress cards using a backplane of the switch.

3. The method of claim 1, wherein the aggregated link comprises a virtual address that specifies a plurality of physical links coupled to the egress ports.

4. The method of claim 1, wherein the step of determining a destination port comprises determining the destination port according to a load-balancing algorithm that distributes traffic among the egress ports of the aggregated link.

5. The method of claim 1, wherein:
the method is performed by an ingress card in an Ethernet switch; and
the aggregated link is identified by a medium access controller (MAC) address.

6. An ingress card of a switch, comprising:
an interface operable to receive a packet comprising a destination identifier;
a memory operable to store:
destination information comprising a plurality of destination identifiers, each destination identifier associated with a link; and
port information for a plurality of links, the port information identifying one or more egress ports for each link; and
a processor operable to:
determine if the destination identifier has been previously learned;
if the destination identifier has been previously learned, determine an aggregated link associated with the destination identifier, the aggregated link comprising a plurality of egress ports, each egress port associated with an egress card of the switch, the switch comprising a plurality of egress cards;
determine a destination port from the egress ports of the aggregated link; and
initiate the communication of the packet to the destination port; and
if the destination identifier has not been previously learned, initiate flooding of the packet to all egress cards of the switch, wherein such flooding comprises:
determining an aggregated link associated with the destination identifier, the aggregated link comprising a plurality of egress ports;
determining whether the aggregated link is isolated such that the aggregated link does not have any egress ports associated with the same egress card as an egress port of a non-aggregated link; and
communicating the packet to each egress card having an egress port included in the aggregated link except for the egress cards having an egress port associated with a non-aggregated link.

7. Logic embodied in a computer readable medium operable, when executed by a processor, to perform the steps of:
receiving a packet comprising a destination identifier;
determining if the destination identifier has been previously learned; if the destination identifier has been previously learned:
determining an aggregated link associated with the destination identifier, the aggregated link comprising a plurality of egress ports, each egress port associated with an egress card of the switch, the switch comprising a plurality of egress cards;
determining a destination port from the egress ports of the aggregated link; and communicating the packet to the destination port: and
if the destination identifier has not been previously learned, flooding the packet to all egress cards of the switch, wherein such flooding comprises:
determining an aggregated link associated with the destination identifier, the aggregated link comprising a plurality of egress ports;
determining whether the aggregated link is isolated such that the aggregated link does not have any egress ports associated with the same egress card as an egress port of a non-aggregated link;
and communicating the packet to each egress card having an egress port included in the aggregated link except for the egress cards having an egress port associated with a non-aggregated link.

8. The logic of claim 7, wherein:
the ingress card is coupled to the egress cards using a backplane of the switch.

9. The logic of claim 7, wherein the aggregated link comprises a virtual address that specifies a plurality of physical links coupled to the egress ports.

10. The logic of claim 7, wherein the step of determining a destination port comprises determining the destination port according to a load-balancing algorithm that distributes traffic among the egress ports of the aggregated link.

* * * * *